United States Patent
Choi et al.

(10) Patent No.: US 10,735,724 B2
(45) Date of Patent: Aug. 4, 2020

(54) METHOD AND DEVICE FOR COMPRESSING IMAGE ON BASIS OF PHOTOGRAPHY INFORMATION

(71) Applicant: Samsung Electronics Co., Ltd., Gyeonggi-do (KR)

(72) Inventors: Woong-il Choi, Gyeonggi-do (KR); Jang-hee Ryu, Seoul (KR); Bong-soo Jung, Gyeonggi-do (KR); Kwang-pyo Choi, Gyeonggi-do (KR); Jung-won Lee, Incheon (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/555,722

(22) PCT Filed: Sep. 8, 2015

(86) PCT No.: PCT/KR2015/009437
§ 371 (c)(1),
(2) Date: Sep. 5, 2017

(87) PCT Pub. No.: WO2016/140414
PCT Pub. Date: Sep. 9, 2016

(65) Prior Publication Data
US 2018/0063526 A1    Mar. 1, 2018

Related U.S. Application Data

(60) Provisional application No. 62/127,026, filed on Mar. 2, 2015.

(51) Int. Cl.
*H04N 19/115*    (2014.01)
*H04N 19/124*    (2014.01)
(Continued)

(52) U.S. Cl.
CPC ........... *H04N 19/115* (2014.11); *H04N 5/225* (2013.01); *H04N 19/124* (2014.11);
(Continued)

(58) Field of Classification Search
CPC .... H04N 19/115; H04N 19/172; H04N 5/772; H04N 5/225; H04N 19/167; H04N 19/162; H04N 19/136; H04N 19/124
See application file for complete search history.

(56) References Cited

U.S. PATENT DOCUMENTS

| 5,666,154 A | 9/1997 | Hirabayashi |
| 7,120,303 B2 | 10/2006 | Mitchell et al. |
| (Continued) | | |

FOREIGN PATENT DOCUMENTS

| CN | 101557520 | 10/2009 |
| CN | 101790047 | 7/2010 |
| (Continued) | | |

OTHER PUBLICATIONS

European Search Report dated Jan. 5, 2018 issued in counterpart application No. 15884080.1-1908, 10 pages.
(Continued)

*Primary Examiner* — Tracy Y. Li
(74) *Attorney, Agent, or Firm* — The Farrell Law Firm, P.C.

(57) ABSTRACT

An image encoding method includes: obtaining imaging information determined during a process of capturing an image; generating metadata for determining a compression strength of the image based on the imaging information; determining the compression strength of the image based on the metadata; and encoding the image based on the determined compression strength.

18 Claims, 13 Drawing Sheets

(51) Int. Cl.
*H04N 19/136* (2014.01)
*H04N 19/162* (2014.01)
*H04N 19/167* (2014.01)
*H04N 5/225* (2006.01)
*H04N 19/172* (2014.01)

(52) U.S. Cl.
CPC ......... *H04N 19/136* (2014.11); *H04N 19/162* (2014.11); *H04N 19/167* (2014.11); *H04N 19/172* (2014.11)

(56) References Cited

U.S. PATENT DOCUMENTS

| | | |
|---|---|---|
| 8,768,063 B2 | 7/2014 | Sugita |
| 9,167,164 B2 | 10/2015 | Baek et al. |
| 9,300,856 B2 | 3/2016 | Yim et al. |
| 2008/0085058 A1* | 4/2008 | Cai ........................ H04N 19/13 382/247 |
| 2009/0135902 A1* | 5/2009 | Nakagomi ........... H04N 19/172 375/240.02 |
| 2010/0111489 A1* | 5/2010 | Presler .................. H04N 5/225 386/278 |
| 2010/0309975 A1 | 12/2010 | Zhou et al. |
| 2010/0309987 A1* | 12/2010 | Concion ................ H04N 5/772 375/240.26 |
| 2012/0242844 A1 | 9/2012 | Walker et al. |
| 2013/0120591 A1 | 5/2013 | Bednarczyk et al. |
| 2015/0022712 A1* | 1/2015 | Koishi ..................... G02B 7/28 348/352 |
| 2018/0063526 A1* | 3/2018 | Choi ....................... H04N 5/225 |

FOREIGN PATENT DOCUMENTS

| | | |
|---|---|---|
| EP | 2 632 155 | 8/2013 |
| JP | 06-54310 | 2/1994 |
| JP | 08-181908 | 7/1996 |
| JP | 2001-145101 | 5/2001 |
| JP | 2002-300405 | 10/2002 |
| JP | 2004-229074 | 8/2004 |
| JP | 2005-260640 | 9/2005 |
| KR | 1020130098074 | 9/2013 |
| KR | 1020130123229 | 11/2013 |
| WO | WO 2013/056129 | 4/2013 |

OTHER PUBLICATIONS

International Search Report dated Feb. 18, 2016 issued in counterpart application No. PCT/KR2015/009437, 20 pages.
Chinese Office Action dated Aug. 1, 2019 issued in counterpart application No. 201580078932.0, 25 pages.
Korean Office Action dated Dec. 30, 2019 issued in counterpart application No. 10-2017-7024812, 12 pages.

* cited by examiner

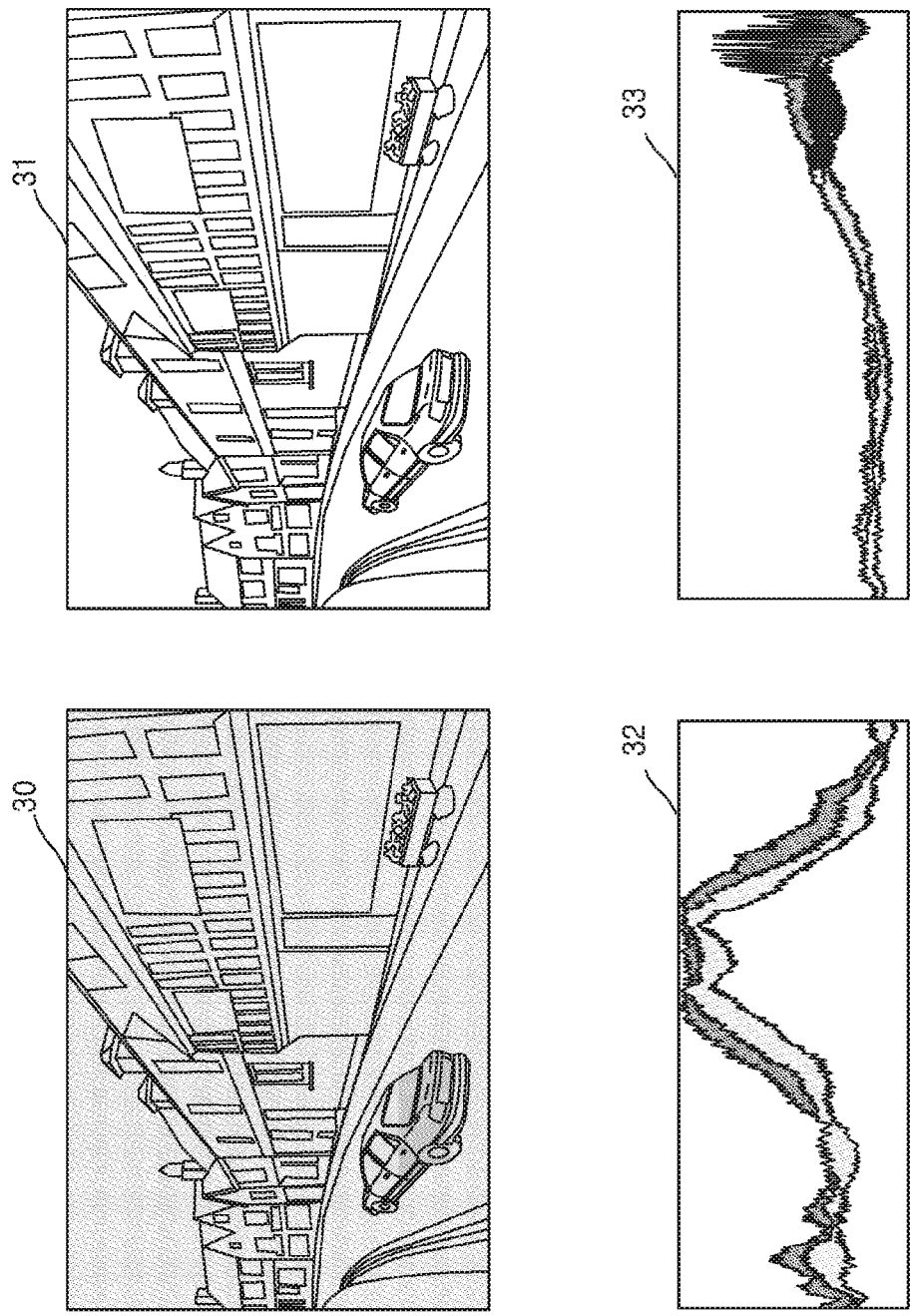

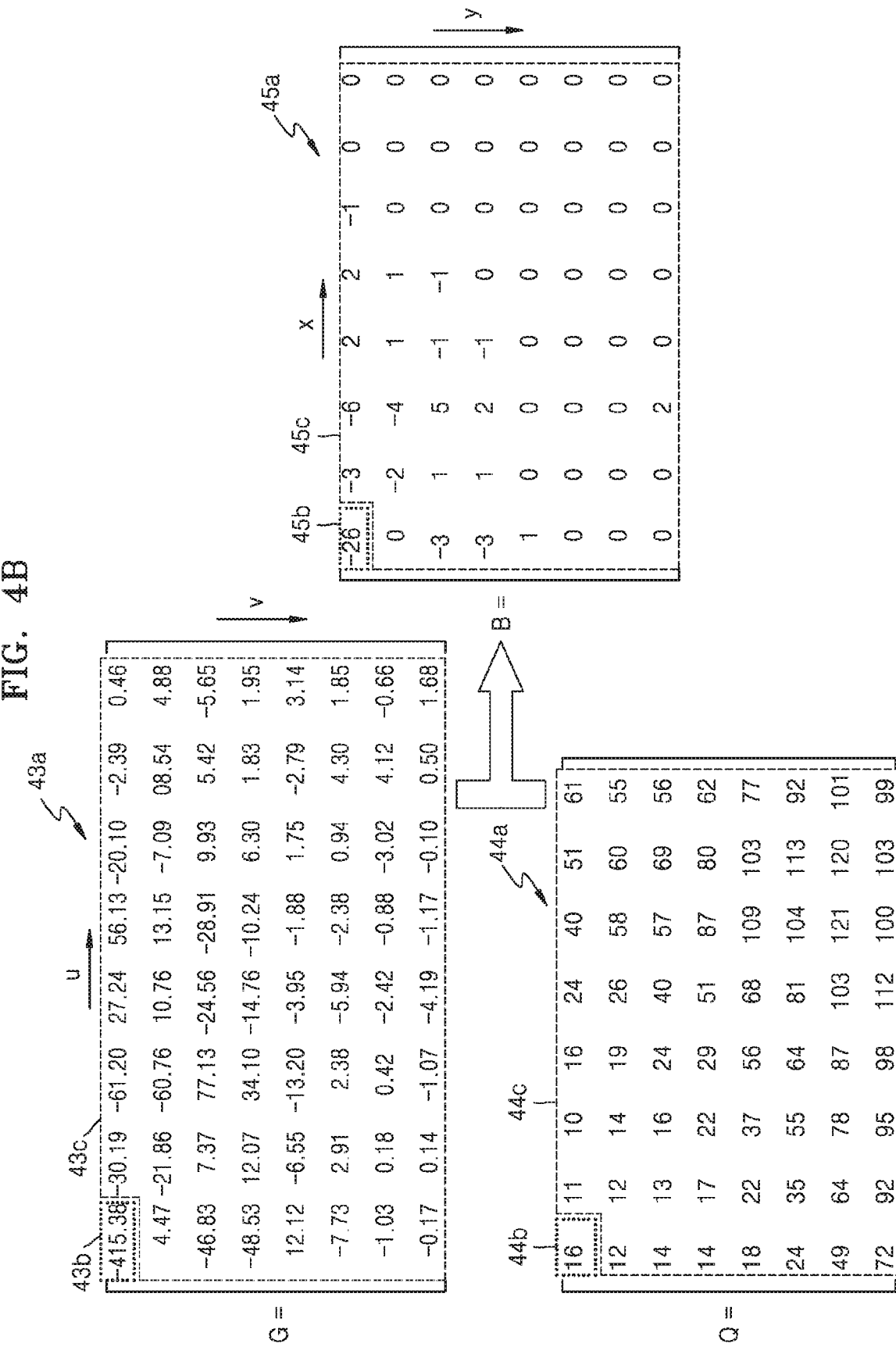

FIG. 4C

LUMINANCE QUANTIZATION TABLE — 46

| 1 | 1 | 1 | 2 | 2 | 3 | 5 | 7 |
|---|---|---|---|---|---|---|---|
| 1 | 1 | 2 | 2 | 3 | 4 | 6 | 8 |
| 1 | 2 | 2 | 3 | 3 | 4 | 6 | 8 |
| 2 | 2 | 3 | 3 | 3 | 5 | 7 | 9 |
| 2 | 3 | 3 | 3 | 4 | 5 | 7 | 9 |
| 3 | 4 | 5 | 4 | 5 | 7 | 8 | 9 |
| 5 | 5 | 6 | 6 | 7 | 8 | 9 | 12 |
| 7 | 7 | 8 | 8 | 9 | 9 | 12 | 14 |

CHROMINANCE QUANTIZATION TABLE — 47

| 2 | 2 | 2 | 3 | 6 | 12 | 15 | 15 |
|---|---|---|---|---|----|----|----|
| 2 | 2 | 3 | 3 | 6 | 13 | 15 | 15 |
| 2 | 3 | 3 | 4 | 7 | 13 | 15 | 15 |
| 3 | 3 | 4 | 5 | 9 | 14 | 15 | 15] |
| 6 | 6 | 7 | 9 | 12 | 15 | 15 | 15 |
| 12 | 12 | 13 | 14 | 15 | 15 | 15 | 15 |
| 15 | 15 | 15 | 15 | 15 | 15 | 15 | 15 |
| 15 | 15 | 15 | 15 | 15 | 15 | 15 | 15 |

# METHOD AND DEVICE FOR COMPRESSING IMAGE ON BASIS OF PHOTOGRAPHY INFORMATION

PRIORITY

This application is a National Phase Entry of PCT International Application No. PCT/KR2015/009437, which was filed on Sep. 8, 2015, and claims priority to U.S. Provisional Patent Application No. 62/127,026, which was filed on Mar. 2, 2015, the contents of each of which are incorporated herein by reference.

TECHNICAL FIELD

An image encoding method and apparatus according to an embodiment may encode an image based on imaging information obtained at the time of capturing the image.

BACKGROUND ART

Apparatuses for encoding an image may compress the image to perform encoding as a method of efficiently decoding the image. A quantization process may be included in such a compression process. When quantization is performed, although deterioration in image quality may occur relative to an original image, image compression may be efficiently performed by performing compression based on whether a user may largely recognize deterioration in image quality. That is, a technology for performing high-efficiency compression without subjective deterioration in image quality has been proposed by performing relatively more compression on portions that are difficult to visually recognize by analyzing an image itself.

DETAILED DESCRIPTION OF THE INVENTION

Technical Problem

In the case of a conventional compression method, since image analysis is performed additionally, a process of analyzing an image becomes complicated, and thus it is difficult to perform the process in real-time simultaneously with image capturing. An image analysis process required to determine a degree of compression usually involves a high degree of complexity because the image analysis process is a method of determining the importance of each region or analyzing a frequency component. When the image analysis process is simplified, accuracy of an analysis result is degraded, and thus deterioration in image quality occurs or a sufficient compression result is difficult to output.

Technical Solution

An image encoding method includes: obtaining imaging information determined during a process of capturing an image; generating metadata for determining a compression strength of the image based on the imaging information; determining the compression strength of the image based on the metadata; and encoding the image based on the determined compression strength.

Advantageous Effects of the Invention

The image encoding method and apparatus according to an embodiment may efficiently perform an encoding process by compressing an image based on imaging information obtained at the time of capturing the image without separately analyzing the captured image itself.

DESCRIPTION OF THE DRAWINGS

FIG. 3 illustrates a process of determining imaging information including information about an average brightness value based on a histogram of an image captured by an image encoding apparatus, according to an embodiment.

FIGS. 4A and 4B illustrate arrangements for indicating a quantization process performed by an image encoding apparatus, according to an embodiment.

FIG. 4C shows a luminance quantization table and a chrominance quantization table, according to an embodiment.

BEST MODE

Figure 1A:
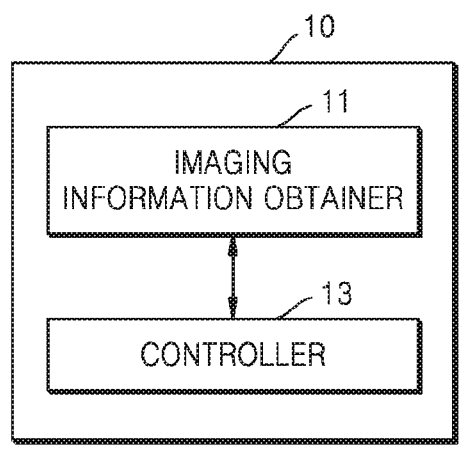
FIG. 1A is a block diagram of an image encoding apparatus according to an embodiment.

According to an embodiment, an image encoding method includes: obtaining imaging information determined during a process of capturing an image; generating metadata for determining a compression strength of the image based on the imaging information; determining the compression strength of the image based on the metadata; and encoding the image based on the determined compression strength.

According to an embodiment, the obtaining of the imaging information may include obtaining imaging information including at least one of an exposure value of the image, a shutter speed, an iris value, and an ISO sensitivity, and wherein the generating of the metadata may include: generating information about an average brightness value of the image based on the obtained imaging information.

According to an embodiment, the obtaining of the imaging information may include obtaining imaging information from a sensor attached to an image capturing apparatus and including at least one of a geomagnetic sensor and an acceleration sensor, and wherein the generating of the metadata may include: generating motion information of the image based on the obtained imaging information."

According to an embodiment, the obtaining of the imaging information may include obtaining imaging information including at least one of information about a face recognition region and information about a focused-on region in the image, and wherein the generating of the metadata may include: generating coordinate information related to the imaging information, based on the obtained imaging information.

According to an embodiment, the determining of the compression strength may include determining of the compression strength to indicate that a region indicated by the imaging information is compressed relatively more weakly than other regions of the image.

According to an embodiment, the determining of the compression strength may include determining the compression strength to indicate that the image is strongly compressed when the average brightness value is higher and the image is weakly compressed when the average brightness value is lower.

According to an embodiment, the determining of the compression strength may include determining the compression strength to indicate that the image is strongly compressed when the motion information indicates that the apparatus moves fast.

According to an embodiment, the obtaining of the imaging information may include obtaining imaging information including at least one of information about a face recognition region and information about a focused-on region, based on a preview image related to the image.

According to an embodiment, the determining of the compression strength may include determining a quantization parameter or a quantization table for quantizing the image based on the metadata.

According to an embodiment, an image encoding apparatus includes an imaging information obtainer configured to obtain imaging information determined during a process of capturing an image; and a controller configured to generate metadata for determining a compression strength of the image based on the imaging information; determine the compression strength of the image based on the metadata; and encode the image based on the determined compression strength.

According to an embodiment, the imaging information obtainer may be further configured to obtain imaging information including at least one of an exposure value of the image, a shutter speed, an iris value, and an ISO sensitivity, and wherein the controller is further configured to generate information about an average brightness value of the image based on the obtained imaging information.

According to an embodiment, the imaging information obtainer may be further configured to obtain imaging information from a sensor attached to an image capturing apparatus and including at least one of a geomagnetic sensor and an acceleration sensor, and wherein the controller is further configured to generate motion information of the image, based on the obtained imaging information.

According to an embodiment, the imaging information obtainer may be further configured to obtain imaging information including at least one of information about a face recognition region and information about a focused-on region in the image, and wherein the controller is further configured to generate coordinate information related to the imaging information, based on the obtained imaging information.

According to an embodiment, the controller may be further configured to determine the compression strength to indicate that a region indicated by the imaging information is compressed relatively more weakly than other regions of the image.

According to an embodiment, the controller may be further configured to determine the compression strength to indicate that the image is strongly compressed when the average brightness value is higher and the image is weakly compressed when the average brightness value is lower.

According to an embodiment, the controller may be further configured to determine the compression strength that the image is strongly compressed when the motion information indicates that the apparatus moves fast.

According to an embodiment, the imaging information obtainer may be further configured to obtain imaging information including at least one of information about a face recognition region and information about a focused-on region, based on a preview image related to the image.

According to an embodiment, the controller may be further configured to determine a quantization parameter or a quantization table for quantizing the image based on the metadata.

A non-transitory computer-readable recording medium having recorded thereon a computer program for executing the image encoding method is provided.

Mode of the Invention

Advantages and features of one or more embodiments of the present invention and methods of accomplishing the same may be understood more readily by reference to the following detailed description of the embodiments and the accompanying drawings. In this regard, the present embodiments may have different forms and should not be construed as being limited to the descriptions set forth herein. Rather, these embodiments are provided so that this disclosure will be thorough and complete and will fully convey the concept of the present embodiments to one of ordinary skill in the art.

Hereinafter, the terms used in the specification will be briefly defined, and the embodiments will be described in detail.

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the invention. Thus, the terms used herein are defined based on the meaning of the terms together with the description throughout the specification.

An expression used in the singular encompasses the expression of the plural, unless it has a clearly different meaning in the context.

When a part "includes" or "comprises" an element, unless there is a particular description contrary thereto, the part may further include other elements, not excluding the other elements. Also, the term "unit" in the embodiments of the present invention means a software component or hardware component such as a field-programmable gate array (FPGA) or an application-specific integrated circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units".

Hereinafter, an "image" may be a static image such as a still image of a video or a dynamic image such as a moving image, i.e., the video itself.

Hereinafter, a "sample" means data to be processed as data assigned to a sampling position of an image. For example, pixel values of the image in the spatial domain, and transform coefficients in the transform domain may be samples. A unit including at least one of these samples may be defined as a block.

Reference will now be made in detail to embodiments, examples of which are illustrated in the accompanying drawings so that one of ordinary skill in the art may implement the one or more embodiments easily. In the following description, well-known functions or constructions are not described in detail so as not to obscure the embodiments with unnecessary detail.

FIG. 1A is a block diagram of an image encoding apparatus 10 according to an embodiment.

According to an embodiment, the image encoding apparatus 10 may include an imaging information obtainer 11 and a controller 13. The imaging information obtainer 11 may obtain imaging information necessary for image processing performed by the image encoding apparatus 10 during a process of capturing an image to be processed. According to an embodiment, the image encoding apparatus 10 may further include an image sensor (not shown) and an optical unit (not shown) capable of capturing an image. Hereinafter, operations performed by the imaging information obtainer 11 and the controller 13 of the image encoding apparatus 10 will be described with reference to specific embodiments.

Figure 1B:
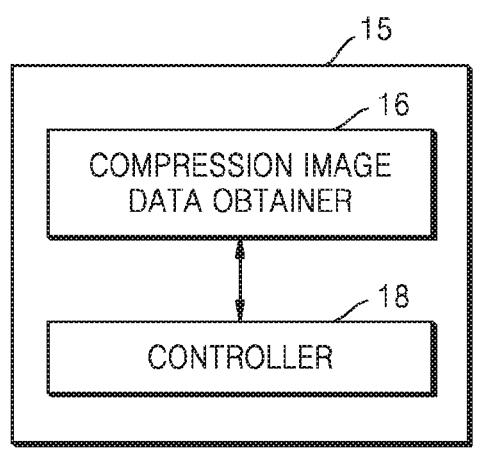
FIG. 1B is a block diagram of an image decoding apparatus for reproducing an image compressed by the image encoding apparatus.
Figure 1C:
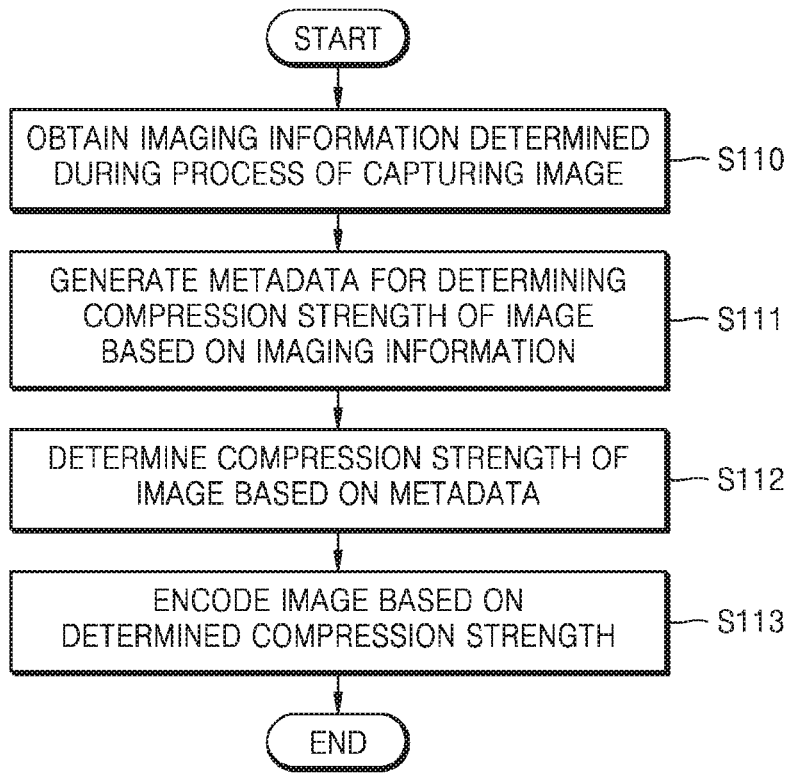
FIG. 1C is a flowchart illustrating an image encoding method that may be performed by an image encoding apparatus, according to an embodiment.

FIG. 1C is a flowchart illustrating an image encoding method that may be performed by the image encoding apparatus 10, according to an embodiment.

In operation S110, the image encoding apparatus 10 may obtain imaging information during a process of capturing an image.

According to an embodiment, the imaging information may correspond to information about a capturing environment, which the image encoding apparatus 10 may obtain during the process of capturing an image. For example, the imaging information may include information about a brightness value obtained from an illuminance sensor when capturing the image. Also, the imaging information may include information about at least one of an exposure value, a shutter speed, an aperture value, and an ISO sensitivity set to capture an image by the image encoding apparatus 10. The information about the exposure value, the shutter speed, the aperture value, and the ISO sensitivity may correspond to an element that may determine brightness of the image to be processed. Therefore, the image encoding apparatus 10 may determine a degree of brightness of an image currently being captured based on the imaging information obtained through the imaging information obtainer 11. That is, the image encoding apparatus 10 may determine the brightness value of the image based only on the imaging information without directly analyzing image data, which is obtained as a result of capturing the image, and thus an additional image analysis process may be omitted.

According to an embodiment, the imaging information obtainer 11 of the image encoding apparatus 10 may obtain information about a motion of the image encoding apparatus 10 as the imaging information during the process of capturing the image. A motion may be generated during a process of capturing an image by the image encoding apparatus 10. When the motion occurs, a sensor attached to the image encoding apparatus 10, for example, the imaging information obtainer 11, may obtain information about a change in an absolute position, whether or not acceleration occurs, a change in a capturing angle, and the like by using a sensor such as a geomagnetic sensor, an acceleration sensor, a gyro sensor, etc.

Figure 2A:
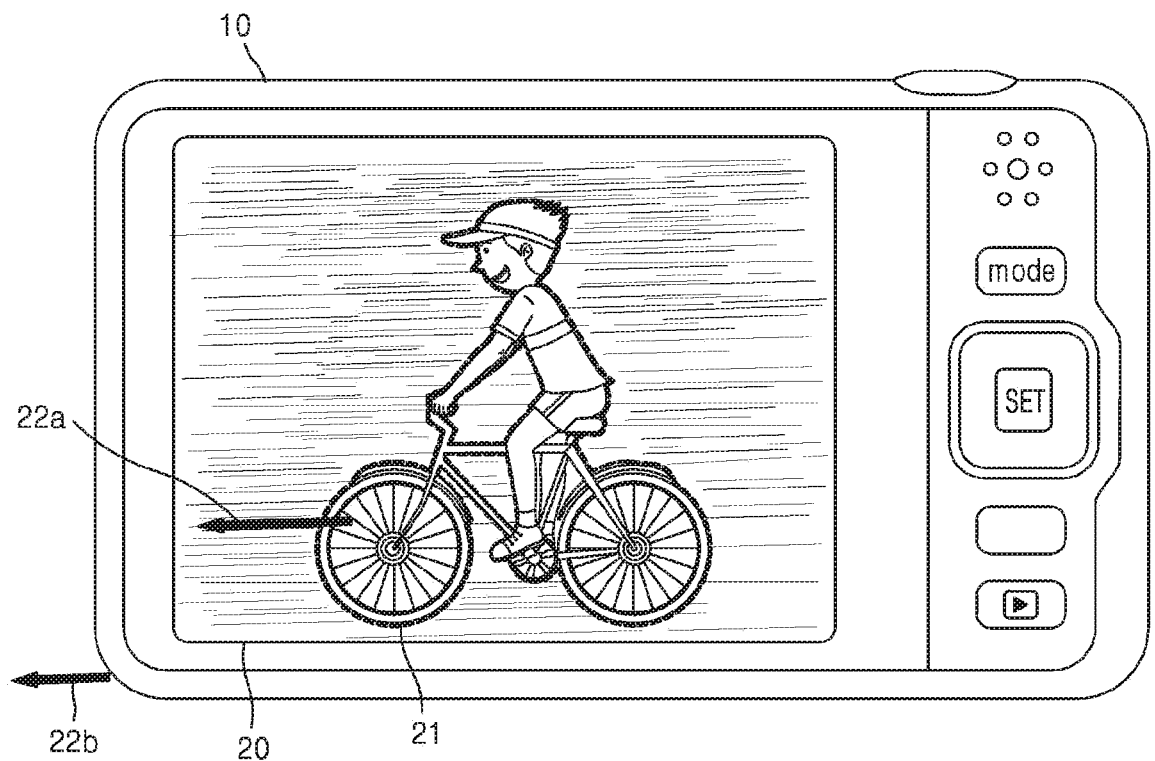
FIG. 2A shows a process of obtaining imaging information, which is information about a motion of an image encoding apparatus when the motion of the image encoding apparatus occurs during a process of capturing an image.

FIG. 2A shows a process of obtaining imaging information, which is information about a motion of the image encoding apparatus 10 when the motion occurs during a process of capturing an image. The image encoding apparatus 10 may generate a motion during a process of capturing an image. Such a motion may occur due to hand tremor of a user during the capturing process or may occur as the user intentionally moves the image encoding apparatus 10 to capture an image of a moving subject. For example, an intentional motion of the image encoding apparatus 10 may occur upon capturing an image by performing an imaging method for highlighting a moving subject such as a panning shot.

Referring to FIG. 2A, according to an embodiment, in order to capture a moving subject 21, the image encoding apparatus 10 may move in a direction 22b corresponding to a direction 22a in which the subject 21 moves. A type of a motion of the image encoding apparatus 10 may be in the form of a change in an angle of an image sensor of the image encoding apparatus 10, a change in a position of the image encoding apparatus 10, an acceleration motion of the image encoding apparatus 10, etc. In order to capture the subject 21 included in an image 20 of FIG. 2A, the image encoding apparatus 10 may capture the image 20 while moving at the same speed as the subject 21 or while changing an angle in order for the image sensor of the image encoding apparatus 10 to face the subject 21. As a result, the imaging information obtainer 11 of the image encoding apparatus 10 may obtain imaging information including information about the motion of the image encoding apparatus 10 during the process of capturing the image 20. The obtained imaging information may include information about a change in the position of the image encoding apparatus 10, a type of the acceleration motion, and a change type of the angle obtained from various types of sensors.

According to an embodiment, the imaging information obtainer 11 of the image encoding apparatus 10 may obtain information about a face recognition area and a focused-on region included in the image during the capturing process. For example, if a person is included in a scene to be captured, the image encoding apparatus 10 may perform a process of recognizing a face of the person. A recognized region may correspond to a relatively more important region than other regions. Accordingly, the image encoding apparatus 10 may perform image compression based on the imaging information by obtaining the imaging information including information about the region corresponding to the person. In another example, a focused-on region in the image captured by the image encoding apparatus 10 may correspond to a relatively more important region than other regions. Therefore, the image encoding apparatus 10 may perform image compression based on the imaging information by obtaining imaging information including information about the focused-on region.

Figure 2B:
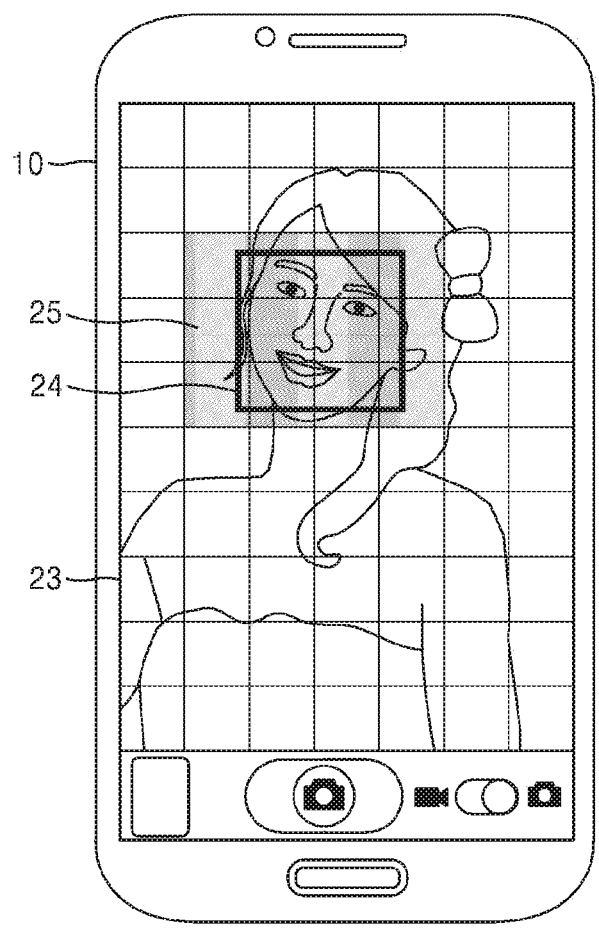
FIG. 2B illustrates a process of recognizing a face of a person when an image encoding apparatus captures an image including the person, according to an embodiment.

FIG. 2B illustrates a process of recognizing a face of a person when the image encoding apparatus 10 captures an image 23 including the person, according to an embodiment. At least one person may be included in the image 23 captured by the image encoding apparatus 10. The image encoding apparatus 10 may distinguish a face region 24 of the person from the image 23. According to an embodiment, the image encoding apparatus 10 may use a preview image that may be displayed on a display (not shown) included in the image encoding apparatus 10 to distinguish the face region 24 of the person in the image 23. The face region 24 may be detected in real time during an image capturing process by using the preview image that may be displayed on the display (not shown) during the process of capturing the image 23. According to an embodiment, when the image encoding apparatus 10 determines that the face 23 includes the person and may distinguish the face region 24, the image encoding apparatus 10 may obtain imaging information including information indicating that the image 23 includes the distinguishable face region 24, through the imaging information obtainer 11 during the capturing process.

Figure 2C:
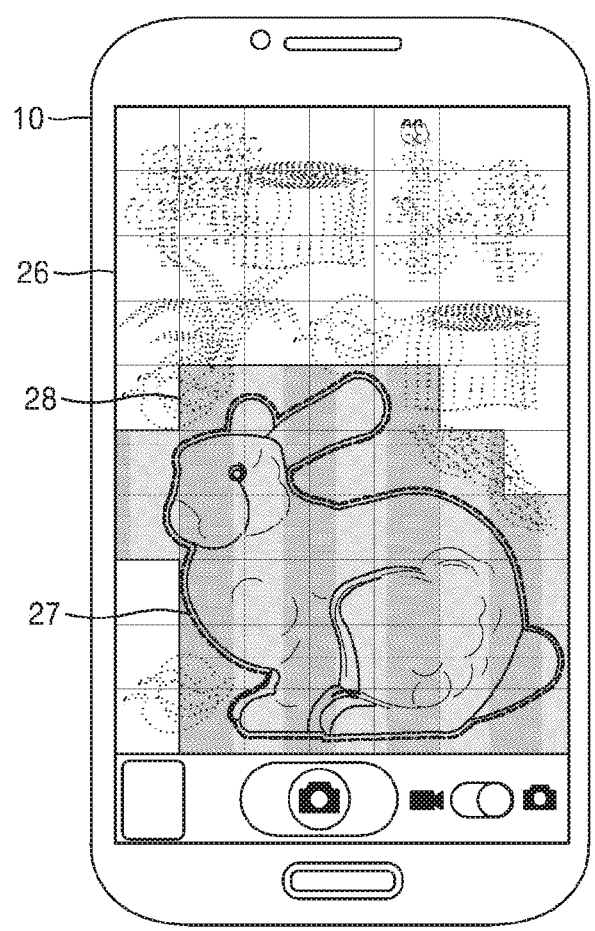
FIG. 2C illustrates a process of distinguishing a focus region which is a focused-on region when the image encoding apparatus captures an image, according to an embodiment.

FIG. 2C illustrates a process of distinguishing a focus region 27 which is a focused-on region when the image encoding apparatus 10 captures an image 26, according to an embodiment. The image 26 captured by the image encoding apparatus 10 may include the focus region 27. The image encoding apparatus 10 may distinguish the focus region 27 from the image 26. A process of distinguishing the focus region 27 may be performed in real time during a process of capturing the image 26. For example, the focus region 27 may be detected using a preview image that may be displayed on a display (not shown) included in the image encoding apparatus 10. According to an embodiment, when the image encoding apparatus 10 distinguishes the focus region 27 from the image 26, the image encoding apparatus 10 may obtain imaging information including information indicating that the image 26 is included in the distinguishable focus region 27, through the imaging information obtainer 11, by performing the processing process.

In operation S111, the controller 13 of the image encoding apparatus 10 may generate metadata for determining a compression strength of the image based on the imaging information obtained in operation S110. The metadata is a data format that may be used during a process of encoding an image captured by the image encoding apparatus 10. According to an embodiment, the metadata may include information that may be used for determining a compression parameter for compressing the image.

According to an embodiment, the controller 13 may obtain metadata including information about an average brightness value of a currently captured image using the obtained imaging information. The controller 13 may obtain metadata including information about an average of brightness values of the current image by using imaging information including an exposure value or the like obtained from the illuminance sensor.

According to an embodiment, the controller 13 may generate metadata including information indicating a motion of an image based on imaging information including information about how an imaging apparatus moves during a process of capturing the image. In this regard, the information indicating the motion of the image may include a global motion vector of the image. According to an embodiment, the image encoding apparatus 10 may obtain imaging information including obtainable motion information by using at least one of an acceleration sensor, a gyro sensor, and a terrestrial magnetism sensor, through the imaging information obtainer 11. The controller 13 may generate information about the global motion vector of the image to be captured based on the obtained imaging information.

According to an embodiment, when the image captured by the image encoding apparatus 10 is a static image, the controller 13 may obtain information about a degree of motion of the image encoding apparatus 10 at a moment of capturing the image, by using a sensor capable of measuring the motion, such as a geomagnetic sensor, an acceleration sensor, or a gyro sensor and determine a global motion vector value related to the captured static image based on the obtained information. In this case, the information about the degree of motion may be interpreted as imaging information, and the global motion vector value may be interpreted as metadata.

According to an embodiment, when the image captured by the image encoding apparatus 10 corresponds to a dynamic image such as video, the controller 13 may obtain information about a degree of motion of the image encoding apparatus 10 while capturing the image, by using a sensor capable of measuring the motion, such as a geomagnetic sensor, an acceleration sensor, or a gyro sensor and determine a global motion vector value related to the captured dynamic image based on the obtained information. Furthermore, the controller 13 may obtain a global motion vector value for the entire dynamic image as well as a motion vector value for a region including an object included in the dynamic image. The motion vector value of the object may be obtained through comparison between regions including the object in a plurality of frames of the dynamic image.

According to an embodiment, the controller 13 may obtain metadata including information about an average brightness value of a captured image based on information about a shutter speed, an aperture value, an ISO sensitivity, etc. related to the currently captured image.

When the image captured by the image encoding apparatus 10 corresponds to a static image, the controller 13 may obtain parameters such as information about the shutter speed, the aperture value, the ISO sensitivity, and the like as the imaging information related to the captured static image from the imaging information obtaining unit 11 and may generate metadata including information about an average brightness value at a moment when the static image is captured, based on the obtained imaging information. For example, in order to determine the average brightness value of the static image, a method of determining the average brightness value of the static image according to a look-up table of brightness values determined based on the information such as the shutter speed, the aperture value, the ISO sensitivity, and the like, may be used.

According to an embodiment, a histogram of the static image captured by the image encoding apparatus 10 may be analyzed to obtain information about the average brightness value. In this regard, the histogram may not only relate to the image itself to be captured, that is, non-compression image data, but may also correspond to a representative image such as a preview image that may be displayed on a display (not shown) of the image encoding apparatus 10. Since the non-compression image data generated by capturing by the image encoding apparatus 10 is represented in an RGB color space, the histogram obtained in the image capturing process may be an RGB histogram. Based on a histogram for each color or an average of the histogram of each color, information about the average brightness value of the static image to be captured may be obtained. For example, the image encoding apparatus 10 may obtain the imaging information indicating that the static image has a large average brightness value when a histogram having a large brightness value for each color is obtained in the static image capturing process. However, the method of determining the average brightness value is not limited thereto. Information about the average brightness value of the image captured by various methods may be determined.

FIG. 3 illustrates a process of determining imaging information including information about an average brightness value based on a histogram of an image captured by the image encoding apparatus 10, according to an embodiment.

Referring to a first histogram 33 of a second image 31 captured by the image encoding apparatus 10, since the second image 31 is relatively bright compared to a first image 30, the first histogram 33 may tend to be positioned relatively more to a right side compared to the first histogram 32. That is, the imaging information obtained by the imaging information obtainer 11 may represent that the average brightness value is relatively high when information about the average brightness value is obtained based on the second histogram 33 compared to when information about the average brightness value is obtained based on the first histogram 31.

According to an embodiment, when the image captured by the image encoding apparatus 10 corresponds to a dynamic image, the controller 13 may obtain parameters such as information about a shutter speed, an aperture value, and an ISO sensitivity, and the like in relation to a plurality of frames included in the dynamic image as the imaging information, during a process of capturing the dynamic image from the imaging information obtainer 11. The controller 13 may generate metadata including the information about the average brightness value for each of the plurality of frames of the dynamic image based on the obtained imaging information. For example, as a method of determining an average brightness value of a plurality of frames, a method of determining an average brightness value of a static image according to a lookup table for a brightness value determined based on the information, such as the shutter speed, the aperture value, and the ISO sensitivity, and the like, that is obtained for the plurality of frames, may be used.

According to an embodiment, the imaging information obtainer 11 may obtain only imaging information of some of the plurality of frames constituting the dynamic image without obtaining imaging information of all of the plurality of frames constituting the dynamic image. The controller 13 may generate metadata including information about the average brightness value for the frames of the dynamic image based on the imaging information of some of the plurality of frames. However, the method of determining the average brightness value is not limited thereto. Information about the average brightness value of the static image may be determined by various methods.

According to an embodiment, a histogram of the dynamic image captured by the image encoding apparatus 10 may be analyzed to obtain the information about the average brightness value. In this regard, the histogram relates to not only the dynamic image itself to be captured, that is, non-compression image data, but also a representative image such as a preview image of the dynamic image that may be displayed on a display (not shown) of the image encoding apparatus 10. The image encoding apparatus 10 may obtain imaging information indicating that the static image has a large average brightness value when a histogram having a large brightness value for each color is obtained for each frame constituting the dynamic image to be captured. Alternatively, the image encoding apparatus 10 may obtain imaging information including information about the average brightness value of all the frames constituting the dynamic image to be captured. However, the method of determining the average brightness value is not limited thereto. Information about an average brightness value of an image to be captured may be determined by using various methods.

According to an embodiment, the imaging information obtainer 11 may obtain imaging information including information about at least one of a face region recognized in a capturing process and a focused-on region. The controller 13 may generate metadata including coordinate information of the corresponding region based on the obtained imaging information.

In operation S112, the controller 13 of the image encoding apparatus 10 may determine a compression strength of an image based on the generated metadata.

According to an embodiment, the image captured by the image encoding apparatus 10 may be encoded using a method that matches a current standard specification. An encoding process using the method that matches the standard specification may include a compression process for efficient bitstream management for delivering raw data of a captured image that is not compressed to a decoding apparatus. The metadata generated by the controller 13 may correspond to an unavailable form in a process of the standard specification. Accordingly, in order to implement an efficient compression method with respect to an image, according to an embodiment, the controller 13 may convert the metadata into a data format that reflects a meaning indicated by the metadata and matches the standard specification. The data format matching the standard specification may be defined as a compression parameter. Such a compression parameter may exist in various forms according to standard specifications. For example, in a standard for reproducing static images (e.g., Joint Photographic Coding Experts Group (JPEG), JPEG-2000, JPEG-XR, WebP, etc.), a quantization table may be used to determine a compression degree of an image. In another example, in a standard for reproducing a dynamic image (for example, H. 264, HEVC, etc.), the compression degree of the image may be determined using a quantization parameter.

According to an embodiment, the controller 13 of the image encoding apparatus 10 may obtain metadata including information about an average brightness value of a currently captured image by using the obtained imaging information and determine a compression parameter that may determine the compression degree of the image based on the metadata about the average brightness value. When the metadata indicates that the average brightness value is high, the image encoding apparatus 10 may determine the compression parameter so as to compress the image greatly. Conversely, when the metadata indicates that the average brightness value is low, the image encoding apparatus 10 may determine the compression parameter so as to compress the image slightly.

According to an embodiment, when the metadata indicates that the average brightness value of the static image is high, the controller 13 may determine the quantization table to indicate that the static image is greatly compressed. In order to encode the static image, the controller 13 may perform DCT (discrete cosine transformation), quantization, and entropy encoding operations on the static image. More specifically, image data captured by the image encoding apparatus 10 may be initially raw image data on which no compression is performed. The raw image data may be represented by an RGB color space. Such raw image data may have higher image quality than compression image data during reproduction, but may be inefficient in processes such as transmission and storage of image data because of a relatively large amount of data. Accordingly, a color space may be changed so that the raw image data may be represented by a YUV space including a luminance component and a chrominance component instead of the RGB color space by performing a color transformation process on the raw image data. In this regard, brightness of a corresponding image may be expressed through the luminance component, and thus a black and white image may be provided when the image is expressed based only on the luminance component. As a user looking at a displayed image, the user may react more sensitively to the luminance component than the chrominance component. That is, the user may more easily recognize a case where brightness is different from a case where colors are different. The image encoding apparatus 10 according to various embodiments may efficiently compress an image by setting high compression strength with respect to an image with low recognition capability of the user based on a visual perception model of the user.

According to an embodiment, the image encoding apparatus 10 may perform down-sampling of the raw image data changed to the YUV space for efficient image compression. Furthermore, the image encoding apparatus 10 may generate the raw image data changed into the YUV space as a sub-image composed of 8×8 blocks. The image encoding apparatus 10 may distinguish DCT coefficients as a DC component and an AC component by performing DCT on split blocks. For example, values of a first row and a first column of a matrix including DCT coefficients output by performing DCT on the sub-image composed of 8×8 blocks may be DC components, and remaining values may correspond to AC components. As a captured image contains a lot of low frequency components, a DC component and AC components located around the DC component may have large values. That is, as complexity of the captured image is small and simple, the DC component and the AC components located around the DC component may have large values. As the complexity of the captured image increases, perception of the user with respect to deterioration in image quality may be reduced, and thus the image encoding apparatus 10 may output an efficient compression result by performing strong compression on an image having a large complexity.

According to an embodiment, the image encoding apparatus 10 may obtain a DCT transform matrix including DCT coefficients through DCT transformation. A DCT transform matrix for the luminance component or the chrominance component may be included in the obtained DCT transform matrix. For the DCT transform matrix, the image encoding apparatus 10 may perform quantization using a quantization table (or a quantization matrix). Specifically, the image encoding apparatus 10 may perform a quantization process by dividing the DCT transform matrix including DCT coefficients for the luminance component or the chrominance component by the quantization table.

Figure 4A:
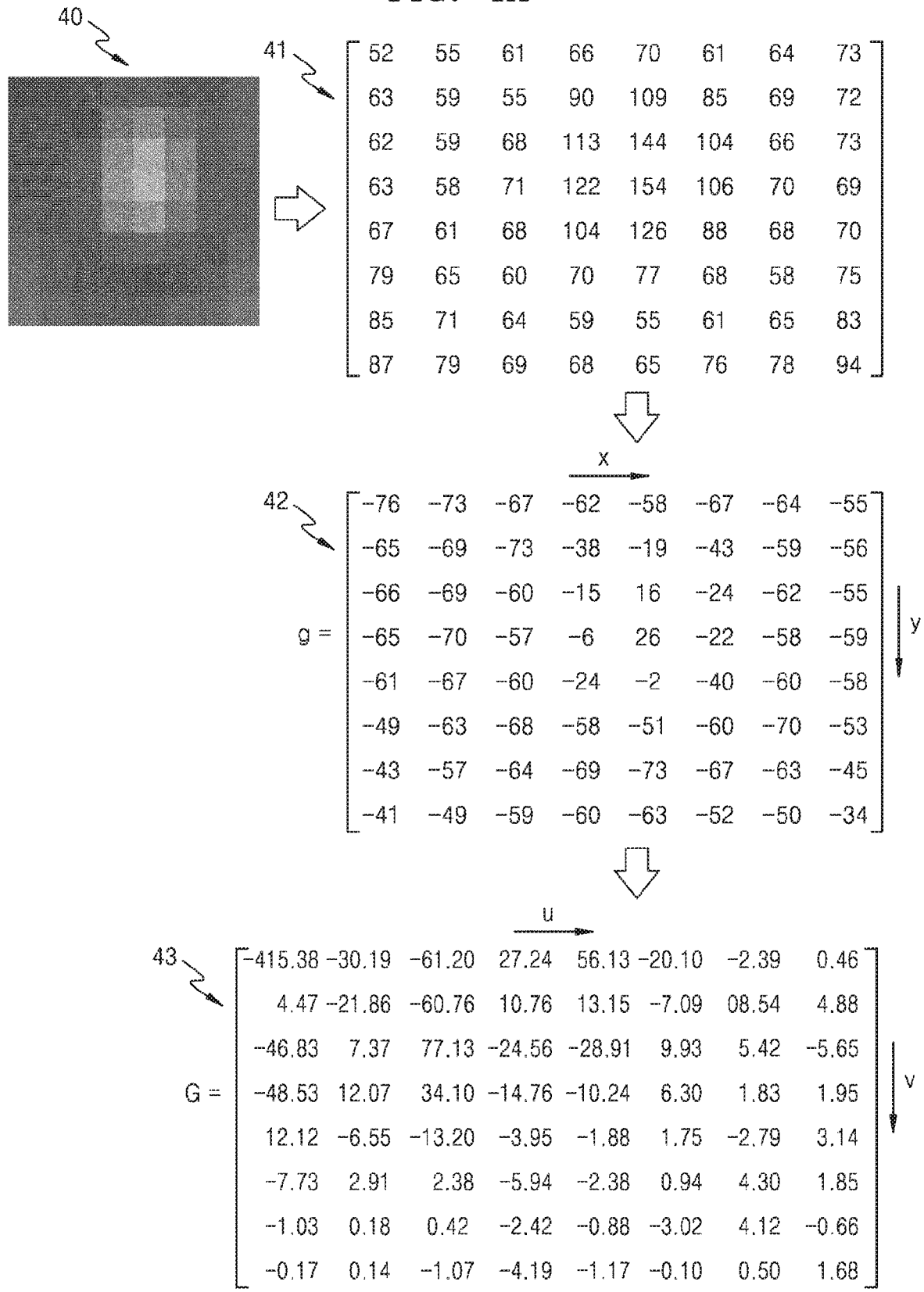

FIGS. 4A and 4B illustrate arrangements for indicating a quantization process performed by the image encoding apparatus 10, according to an embodiment.

Referring to FIG. 4A, the image encoding apparatus 10 may generate a sub-image 40 composed of 8×8 blocks for a luminance component or a chrominance component for raw image data generated with respect to a capturing image and may generate a sub-image matrix 41 representing values of the sub-image 40. The values of the sub-image matrix 41 generated according to an embodiment may be represented by 8 bits. That is, since the values included in the sub image matrix 41 may have 256 values, the image encoding apparatus 10 may transform the values of the sub image matrix 41 to have an integer value from −128 to 127 to generate a transformed sub-image matrix 42. The image encoding apparatus 10 may generate a DCT transform matrix 43a by performing DCT transformation on the transformed sub image matrix 42.

Referring to FIG. 4B, the image encoding apparatus 10 may use a quantization table 44a for processing the DCT transform matrix 43a. According to an embodiment, the image encoding apparatus 10 may use a quantization table for a luminance component or a quantization table for a chrominance component as the quantization table 44a. Hereinafter, it will be described on the assumption that the quantization table for the luminance component is used for convenience of explanation. The DCT transform matrix 43a includes coefficients for a DC component and an AC component. Accordingly, the image encoding apparatus 10 may perform quantization by distinguishing the DC component and the AC component in a quantization process. The image encoding apparatus 10 may generate a quantized matrix 45a by dividing the DCT transform matrix 43a into the quantization table 44a. Therefore, quantization may be performed on a DC component 43b and AC components 43c included in the DCT transform matrix 43a according to AC quantization values 44c that are remaining values except for a DC quantization value 44b that is a value located at a first row and a first column among values included in the quantization table 44a. Thus, the quantized matrix 45a may include a quantized DC component 45b and quantized AC components 45c. More specifically, as complexity of the image obtained with respect to the image captured by the image encoding apparatus 10 increases, a value of the quantized DC component 45b may increase, and values of AC components close to the quantized DC component 45b among the quantized AC components 45c may increase.

According to an embodiment, in a process of the image encoding apparatus 10 performing quantization of a static image using the quantization table, the image encoding apparatus 10 may perform quantization by using at least one of a quantization table for a luminance component and a quantization table for a chrominance component. FIG. 4C shows a luminance quantization table 46 and a chrominance quantization table 47 according to an embodiment. Referring to FIG. 4C, it may be seen that the luminance quantization table 46 and the chrominance quantization table 47 contain different values. Specifically, the luminance quantization table 46 includes a smaller value than the chrominance quantization table 47 as a whole. The image encoding apparatus 10 using the luminance quantization table 46 including a small value may determine that an image is compressed at a lower compression strength on the luminance component than on the chrominance component using the chrominance quantization table 47. Since a user is less sensitive to a change in the chrominance component than a change in the luminance component, even if the chrominance component is compressed more than the luminance component, the user may not recognize the change in the chrominance component. Therefore, in accordance with a visual perception model of the user, the image encoding apparatus 10 may compress the chrominance component more than the luminance component based on the luminance quantization table 46 and the chrominance quantization table 47.

According to an embodiment, the image encoding apparatus 10 may use a quantization parameter to compress a dynamic image. In a process of encoding the dynamic image, quantization may be performed on a plurality of blocks included in each frame, and a compression strength through quantization may be determined based on size of the quantization parameter. Standard specifications for processing the dynamic image captured by the image encoding apparatus 10 may vary. For example, the image encoding apparatus 10 may encode or decode an image through a process matching a moving image compression standard such as Moving Picture Experts Group (MPEG), H. 26X, and the like.

According to an embodiment, the image encoding apparatus 10 may generate a bitstream by compressing image data through a prediction step, a transformation step, a quantization step, and a coding step. In the prediction step, a prediction image of image data to be encoded may be formed through intra prediction using spatial correlation of images or inter prediction using temporal correlation. Furthermore, the prediction image may be formed through interlayer prediction which may perform a prediction process between layers by processing image data composed of a plurality of layers.

In the transformation step, the image encoding apparatus 10 transforms error data which is a difference value between the prediction image formed in the prediction step and an original image into a transform domain using various transformation techniques. For example, in H.264, discrete cosine transformation (DCT), Hadamard transformation, or the like may be used as an example of a typical transformation technique.

In the quantization step, the image encoding apparatus 10 suitably loss-compresses transform coefficients generated through the transform step according to a size of a target bitstream. The image encoding apparatus 10 may generate a large number of standard images and video codecs based on loss compression by performing a quantization process according to the quantization step. A quantization process obtains a quantized value by dividing an input value by the quantization step and then integrating the input value. Since the quantized value is an integer value within a range of (1/quantization step) in an original range of the input value, an amount of information may be loss-compressed through the quantization process. Since all loss compression techniques include the quantization step, a complete reconstruction of original data is impossible whereas a compression rate may be increased.

Figure 5:
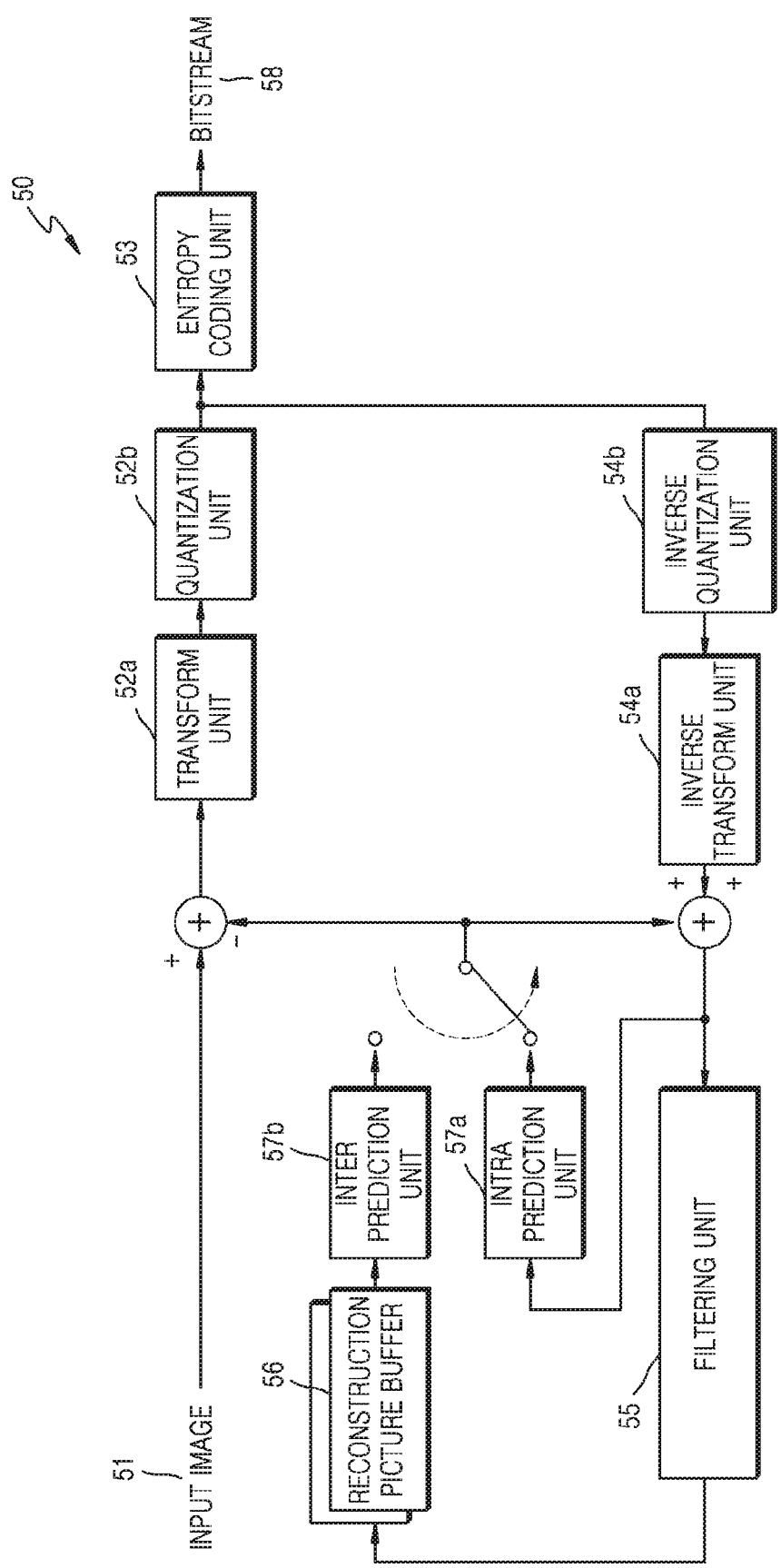
FIG. 5 shows a configuration of an image encoding apparatus for encoding a dynamic image, according to an embodiment.

FIG. 5 shows a configuration of an image encoding apparatus 50 for encoding a dynamic image, according to an embodiment. The image encoding apparatus 50 of FIG. 5 may correspond to the image encoding apparatus 10 of FIG. 1A.

The image encoding apparatus 50 according to an embodiment performs operations for the controller 13 of the image encoding apparatus 10 in FIG. 1A to encode image data. In order to apply the image encoding apparatus 50 according to an embodiment to the image encoding apparatus 10 of FIG. 1A, the controller 13 may include an inter prediction unit 57b, an intra prediction unit 57a, a transform unit 52a, a quantization unit 52b, an entropy coding unit 53, an inverse quantization unit 54b, an inverse transform unit 54a, a deblocking unit (not shown), and a SAO performing unit (not shown) capable of performing an operation on each of coding units included in a maximum coding unit.

The intra prediction unit 57a performs intra prediction on a coding unit of an intra mode of a current image 51 for each prediction unit. The inter prediction unit 57b performs inter prediction on a coding unit of an inter mode for each prediction unit by using the current image 51 and a reference image obtained by a reconstruction picture buffer 56. The current image 51 may be divided into a maximum encoding unit and then encoded sequentially. At this time, encoding may be performed on a coding unit in which the maximum encoding unit is divided into a tree structure.

Residual data is generated by subtracting prediction data for a coding unit of each mode output from the intra prediction unit 57a or the inter prediction unit 57b from data for a coding unit of the current image 51 that is to be encoded and is output as a transform coefficient quantized for each transform unit through the transform unit 52a and the quantization unit 52b. The quantized transform coefficients are reconstructed to residual data of a spatial domain through the inverse quantization unit 54b and the inverse transform unit 54a. The residual data of the reconstructed spatial region is added to the prediction data for the coding unit of each mode output from the intra prediction unit 57a or the inter prediction unit 57b and thus reconstructed as data of the spatial domain for the coding unit of the current image 51. The reconstructed data of the spatial domain may pass through a filtering unit 55 so that an artifact may be reduced. According to an embodiment, the filtering unit 55 of the image encoding apparatus 10 may include a deblocking unit (not shown) capable of performing deblocking filtering and a SAO (Sample Adaptive Offset) performing unit (not shown) capable of performing in-loop filtering using an SAO. The generated reconstruction image is stored in the reconstruction picture buffer 56. Reconstruction images stored in the reconstruction picture buffer 56 may be used as reference images for inter prediction of other images. The transform coefficients quantized in the transforming unit 52a and the quantizing unit 52b may be output to as bitstream 58 via the entropy encoding unit 53.

The controller 13 of the image encoding apparatus 50 according to an embodiment may perform a quantization process corresponding to a feature of the quantization unit 52b and perform an inverse quantization process corresponding to a feature of the inverse quantization unit 54b. That is, the controller 13 may determine a compression strength for determining a degree of compressing the dynamic image based on the quantization parameter. The compression strength may be determined based on a quantization parameter of each of a luminance component and a chrominance component constituting the dynamic image. The data quantized with the determined compression strength may then be used to generate a reconstruction image by going through an inverse process of the quantization unit 52b through the inverse quantization unit 54b.

According to an embodiment, the image encoding apparatus 10 may determine a quantization coefficient based on the following Equation 1, $$Q_{Coeff} = sgn(\text{Coeff}) * \text{round}[(\text{Coeff})/Q_{step} + \text{Offset}] \quad \text{[Equation 1]}$$

wherein, Coeff denotes an original transform coefficient, Offset denotes an offset, Q_Step denotes a quantization step, Q_Coeff denotes a quantized transform coefficient, and round indicates an arithmetic operation that matches a real number in parentheses ([ ]) with an integer not greater than the real number but closest to the real number. Also, a sgn (Coeff) function has a value of 1 when a Coeff value in the parentheses is larger than 0, and a value of −1 when the Coeff value is smaller than 0. The offset is a real value between 0 and 1 and may be set to have the same value in an encoding apparatus and a decoding apparatus.

Referring to Equation 1, the quantization unit 110 performs quantization by dividing a transform coefficient by a predetermined quantization step Q_Step to output a quantization coefficient. The quantization step Q_Step may have a predetermined value by a quantization parameter QP according to the image compression standard. For example, the image encoding apparatus 10 may determine the quantization step Q_Step predetermined by the quantization parameter QP as shown in Table 1 below.

TABLE 1

| QP | 0 | 1 | 2 | 3 | 4 | 5 | 6 | 7 | 8 | 9 | 10 | ... |
|---|---|---|---|---|---|---|---|---|---|---|---|---|
| Q_Step | 0.625 | 0.6875 | 0.8125 | 0.875 | 1 | 1.125 | 1.25 | 1.375 | 1.625 | 1.75 | 2 | ... |
| QP | ... | 18 | ... | 24 | ... | 30 | ... | 36 | ... | 42 | ... | 48 |
| Q_Step | | 5 | | 0 | | 20 | | 40 | | 80 | | 160 |

Figure 7:
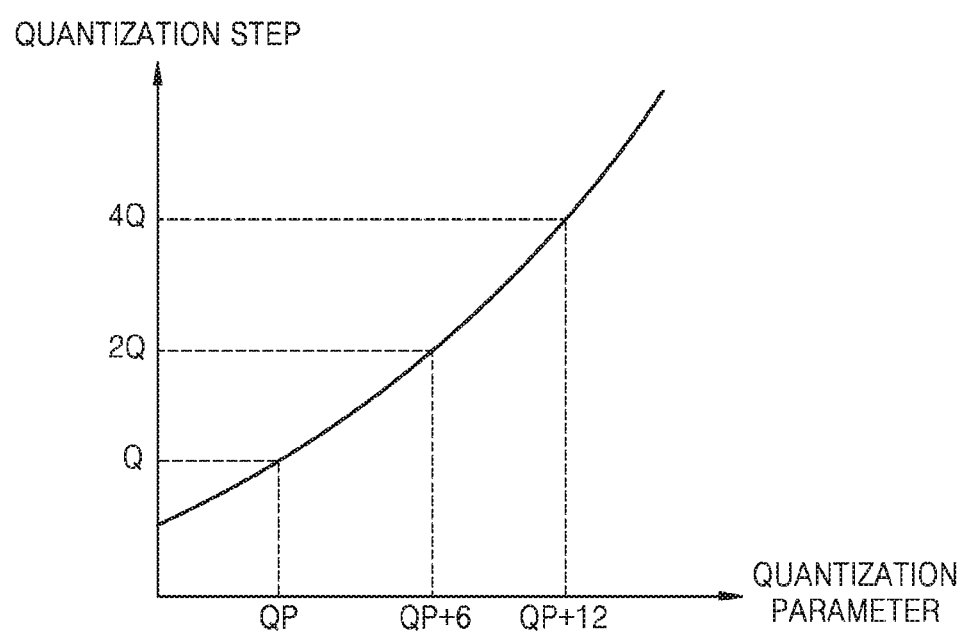
FIG. 7 is a graph showing a relationship between a quantization parameter and a quantization step.

FIG. 7 is a graph showing a relationship between the quantization parameter QP and the quantization step Q_Step.

Referring to FIG. 7, generally, the quantization parameter QP has a proportional relationship with the quantization step Q_Step. For example, in an image compression standard such as H.264/AVC, HEVC, and the like, the quantization step Q_Step increases by 2 every time the quantization parameter QP increases by 6 as seen from Table 1 above. In this way, the quantization unit 52b may perform quantization using a quantization step defined by the quantization parameter QP. Quantization coefficients are rearranged in a predetermined order and entropy-encoded by the entropy encoding unit 53 to generate a bitstream. In order to obtain a reference picture used for predicting a B picture or a P picture, a quantized picture is reconstructed through the inverse quantization unit 54b and the inverse transform unit 54a. The reconstructed picture is stored in the reconstruction picture buffer 56 after being filtered through the filtering unit 55 capable of performing deblocking filtering or SAO filtering and may be used as a reference picture for a next picture.

The intra prediction unit 57a and the inter prediction unit 57b determine a partition mode and a prediction mode of each coding unit among coding units according to a tree structure in consideration of a maximum size and a maximum depth of a current maximum coding unit. The transform unit 52a may determine whether or not to split a transform unit according to a quad-tree in each coding unit among the coding units according to the tree structure.

However, since the image encoding method described with reference to FIG. 5 is only an embodiment for explaining a feature in which a quantization parameter is used, the image encoding method performed by the image encoding apparatus 10 is not limited to or to be interpreted as the above encoding method.

According to an embodiment, the controller 13 of the image encoding apparatus 10 may obtain metadata based on the imaging information obtained through the imaging information obtainer 11 and determine a compression strength based on the obtained metadata. A method of determining the compression strength of the image encoding apparatus 10 may vary according to characteristics of an image. As described in the above embodiments, the compression strength may be determined based on a quantization table related to compression of a static image, a quantization parameter related to compression of the dynamic image, etc. Furthermore, in the image compression standard for processing the dynamic image, the compression strength may be determined according to types of a plurality of frames constituting the dynamic image. For example, the image encoding apparatus 10 may compress an I frame with a relatively low strength as compared with compression that performs inter-view prediction for a B frame or a P frame. Since the I frame has a higher importance than the B frame or the P frame, it is necessary to reduce compression loss by performing compression with a low degree of compression strength. The image encoding apparatus 10 may reduce a value of the quantization parameter in order to reduce the compression strength of the I frame as in the above embodiment. As another example, the controller 13 of the image encoding apparatus 10 may determine whether to perform intra-frame prediction or inter-view prediction on a related frame in order to adjust the compression strength of the dynamic image. This is related to which of the I frame, B frame, or P frame is determined to be a current frame's type. That is, when the current frame corresponds to a frame having high importance, the image encoding apparatus 10 may determine a type of the current frame as the I frame for performing intra-frame prediction. If the current frame corresponds to a frame having low importance, the image encoding apparatus 10 may determine the type of the current frame as the B frame or the P frame for performing inter-view prediction.

According to an embodiment, the controller 13 of the image encoding apparatus 10 may obtain information about bitrates of the plurality of frames constituting the dynamic image. The higher the average brightness value of the dynamic image captured by the image encoding apparatus 10 is, the more the user is insensitive to deterioration in image quality, and thus the compression strength for the frames constituting the dynamic image may be increased. In order to increase the compression strength by compressing the image, the image encoding apparatus 10 may reduce the bitrate.

According to an embodiment, the image encoding apparatus 10 may split the dynamic image into blocks having a predetermined size in a process of encoding the dynamic image. The split blocks of a predetermined size may include blocks having various sizes including macroblocks, coding units, and the like. That is, the controller 13 of the image encoding apparatus 10 may separately determine the compression strength for compressing the dynamic image for each block. Depending on the compression strength set separately, the image encoding apparatus 10 may set a compression strength of an important part to be lower (than other non-important parts on each of the frames constituting the dynamic image. Accordingly, the image encoding apparatus 10 may determine that deterioration in image quality for the important part is relatively less than deterioration in image quality for non-important parts in the process of encoding the dynamic image. That is, flexible compression strength setting on each frame is possible. Hereinafter, for convenience of explanation, the block of the predetermined size used for determining the compression strength in the process of encoding the dynamic image by the image encoding apparatus 10 will be described with reference to a block corresponding to a coding unit. However, the block of the predetermined size used for determining the compression strength by the image encoding apparatus 10 is not limited to or to be interpreted as the block corresponding to the coding unit.

According to an embodiment, the imaging information obtainer 11 of the image encoding apparatus 10 may obtain imaging information including information about whether a face of a person is recognized in a process of capturing a dynamic image including the person. When it is determined that the face in the dynamic image is recognized according to the imaging information, the controller 13 of the image encoding apparatus 10 may generate coordinates of a face region.

That is, referring to FIG. 2B, the image 23 captured by the image encoding apparatus 10 may be a dynamic image. The dynamic image may include at least one person. The image encoding apparatus 10 may distinguish the face region 24 of the person from the image 23. The image encoding apparatus 10 that recognized the face region 24 may determine a compression strength of a part corresponding to the face region 24 during an encoding process. The controller 13 of the image encoding apparatus 10 may set metadata including information about the coordinates of the face region 24 of the person on each frame of the image 23 that is the dynamic image. The controller 13 of the image encoding apparatus 10 may determine at least one coding unit 25 including the coordinates of the face region 24 from among a plurality of coding units included in the image 23 based on the information about the coordinates. The at least one encoding unit 25 associated with the face region 24 determined by the controller 13 may be set to be compressed at a different compression strength than other coding units. For example, since the face region 24 included in the image 23 may correspond to a region that is important to the user, the compression strength should be lower than those of other regions. Accordingly, the controller 13 of the image encoding apparatus 10 may set the compression strength of the at least one coding unit 25 associated with the face region 24 to be lower than those of the other coding units.

According to an embodiment, the imaging information obtainer 11 of the image encoding apparatus 10 may obtain imaging information including information about whether a subject is focused on in the process of capturing the dynamic image. When the subject is focused on, the controller 13 of the image encoding apparatus 10 may generate coordinates of a focused-on region as metadata.

That is, referring to FIG. 2B, the image 26 captured by the image encoding apparatus 10 may be a dynamic image. The dynamic image may include a focus region that is the focused-on region. The image encoding apparatus 10 may distinguish a focus region 27 from an image 26. The image encoding apparatus 10 that recognized the focus region 27 may determine a compression strength of a part corresponding to the focus region 27 during the encoding process. The controller 13 of the image encoding apparatus 10 may set metadata including information about the coordinates of the focus region 27 on each frame of the image 26 that is the dynamic image. The controller 13 of the image encoding apparatus 10 may determine at least one coding unit 28 including the coordinates of the focus region 27 from among a plurality of coding units included in the image 26 based on the information about the coordinates. The at least one coding unit 28 associated with the focus region 27 determined by the controller 13 may be set to be compressed at a different compression strength than those of other encoding units. For example, since the focus region 27 included in the image 26 may correspond to a region that is important to the user, the compression strength should be lower than those of other regions. Therefore, the controller 13 of the image encoding apparatus 10 may set the compression strength of the at least one coding unit 28 associated with the focus region 27 to be lower than those of the other coding units.

According to an embodiment, the imaging information obtainer 11 of the image encoding apparatus 10 may obtain information about a capturing mode currently used by the image encoding apparatus 10 to capture an image. For example, the image encoding apparatus 10 may use the capturing mode such as a night mode, a panning shot mode, a portrait mode, a backlight mode, etc. during image capturing.

According to an embodiment, when the image encoding apparatus 10 uses a capturing mode for capturing the image in a dark environment, for example, a night mode, since brightness of the entire image may be low, a luminance value may be relatively less than that of a normal capturing mode. When the luminance value is small, since sensitivity of the user to a luminance component is higher than that when the luminance value is large, the compression strength needs to be reduced. Therefore, the controller 13 may determine the compression strength on the basis of the information indicating that capturing is performed in a dark environment use mode as the imaging information obtained by the imaging information obtainer 11. In this case, the controller 13 may generate metadata indicating a predetermined standard brightness value for the dark environment use mode.

According to an embodiment, when the image encoding apparatus 10 uses a mode for capturing an image, for example, a panning shot mode, since the image encoding apparatus 10 captures the image while moving, a global motion vector of the image may be larger than that of a normal mode. If the global motion vector is large, since the user's perception of deterioration in image quality may be low, even if the image is compressed more strongly than in the normal mode, the user may not perceive very low deterioration in image quality compared to the normal mode. Therefore, the image encoding apparatus 10 that has obtained imaging information indicating that a current capturing mode is a mode for capturing a subject having a lot of motion may strongly compress the image. The controller 13 may strongly determine the compression strength based on the information indicating that capturing is performed in the mode for capturing the subject having a lot of motion as the imaging information obtained by the imaging information obtainer 11. In this case, the controller 13 may generate metadata including information about a predetermined motion of the image encoding apparatus 10 with respect to the dark environment use mode. That is, the image encoding apparatus 10 may generate the metadata including the information about the predetermined motion of the image encoding apparatus 10 by referring to only a capturing mode In operation S113, the image encoding apparatus 10 may encode the image based on the compression strength determined in operation S112. The method of encoding the image may vary depending on whether the image is a static image or a dynamic image, and may vary according to the image compression standard used for each image.

According to the above-described various embodiments, the image encoding apparatus 10 may use the imaging information that may be obtained in an image capturing process in order to compress the image. Hereinafter, features of an image decoding apparatus for decoding the image encoded by the image encoding apparatus 10 will be described.

FIG. 1B is a block diagram of an image decoding apparatus 15 for reproducing an image compressed by the image encoding apparatus 10.

The image decoding apparatus 15 may receive compression image data including data of an image encoded by the image encoding apparatus 10 through a compression image data obtainer 16. That is, the compression image data may include compression image data encoded by the image encoding apparatus 10 in operation S113. The image decoding apparatus 15 may reproduce the image by reconstructing an image before it was compressed by using the received compression image data. The compression image data obtained by the image decoding apparatus 15 may be encoded in a data format matched with a standard specification. For example, the compression image data may be compression image data compressed and encoded using a standard for reproducing a static image (e.g., Joint Photographic Coding Experts Group (JPEG), JPEG-2000, JPEG-XR, WebP, etc.). As another example, the compression image data may be compression image data encoded using a standard for reproducing a dynamic image (for example, H.264, HEVC, etc.).

According to an embodiment, the image decoding apparatus 15 may reproduce the compression image data through an inverse quantization step, an inverse transformation step, a prediction step, and a reconstruction step of the compression image data. This process of the image decoding apparatus 15 may correspond to a process opposite to an image compressing process of the image encoding apparatus 10, according to an embodiment.

The compression image data received by the image decoding apparatus 15 may be compression image data at a compression strength determined based on the metadata obtained by the controller 13 of the image encoding apparatus 10. For example, the image encoding apparatus 10 may compress an image capable of determining compression strength of the image based on metadata with respect to an average brightness value, encode the compressed image, and transmit the encoded image to the image decoding apparatus 15. When the metadata indicates that the average brightness value is high, a compression parameter may be determined so as to greatly compress the image. Conversely, when the metadata indicates that the average brightness value is low, the compression parameter may be determined so as to compress the image slightly. The image decoding apparatus 15 may reproduce the image using quantized compression image data according to the compression strength determined through the above process.

According to an embodiment, the image decoding apparatus 15 may obtain compression image data by compressing the image having the high average brightness value. The image decoding apparatus 15 may decode the image using a quantization table determined to indicate that the image is to be greatly compressed by the image encoding apparatus 10 when the average brightness value of the static image to be reconstructed is high. In order to decode the static image, the controller 15 may perform steps on the static image such as inverse transformation and inverse quantization, etc. More specifically, the image data captured by the image encoding apparatus 10 may be raw image data that is not initially compressed. The raw image data may be represented by an RGB color space. Although such raw image data may have higher image quality than the compression image data during reproduction, the raw image data may be inefficient in processes such as transmission and storage of image data because of a relatively large amount of data. Therefore, the color space may be changed so that the raw image data may be represented by a YUV space including a luminance component and a chrominance component, instead of the RGB color space, through a color transformation process. In this regard, a brightness of a related image may be expressed through the luminance component, and thus a black and white image may be provided when the image is expressed based only on the luminance component. As a user looking at a displayed image, the user may react more sensitively to the luminance component than the chrominance component. The user may more easily recognize the case where brightness is changed more than the case where colors are changed. Accordingly, the image encoding apparatus 10 may perform efficient image compression based on a visual perception model, and the image decoding apparatus 15 may obtain the compression image data according to the visual perception model. That is, the compression image data obtained by the image decoding device 15 may include image data effectively compressed by strongly setting a compression strength in the case of an image having a low recognition capability by the user, based on the visual perception model of the user.

According to an embodiment, the compressed image data obtained by the image decoding apparatus 15 may be data in which the uncompressed image data converted into the YUV space is down sampled by the image encoding apparatus 10. Further, the image decoding apparatus 15 may divide the compression image data into 8×8 blocks for image reconstruction. The image decoding apparatus 15 may divide DCT coefficients into a DC component and an AC component by performing DCT on the divided blocks. For example, a value of a first row and a first column of a matrix including the DCT coefficients output by performing DCT on a sub-image composed of 8×8 blocks may be the DC component, and remaining values may correspond to AC components. As a captured image contains a lot of low frequency components, the value of the DC component and the values of the AC components located around the DC component may be large. That is, the value of the DC component and the values of the AC components located around the DC component may be large as complexity of the captured image is low and is simple. As the complexity of the captured image increases, since the user may have poor perception of deterioration in image quality, the image decoding apparatus 15 may efficiently reconstruct and reproduce an image that has been subjected to strong compression and having a high complexity.

According to an embodiment, in a process of performing inverse quantization on the compression image data for the static image using a quantization table, the image decoding apparatus 15 may perform inverse quantization using at least one of a quantization table for the luminance component and a quantization table for the chrominance component. FIG. 4C shows a luminance quantization table 46 and a chrominance quantization table 47 according to an embodiment. Referring to FIG. 4C, it may be seen that the luminance quantization table 46 and the chrominance quantization table 47 contain different values. Specifically, the luminance quantization table 46 includes smaller values than the chrominance quantization table 47 as a whole. When the luminance component of the image is compressed using the luminance quantization table 46 including small values, since the luminance component is compressed using the chrominance quantization table 47, the image decoding device 15 may inverse quantize a compressed image with a lower compression strength than compressing the chrominance component. The user is less sensitive to a change in the chrominance component than a change in the luminance component, and thus even if the chrominance component is compressed more strongly than the luminance component, the user may not recognize the change in the chrominance component. Therefore, in accordance with the visual perception model of the user, the image decoding apparatus 15 may perform inverse quantization on image data more strongly compressed with respect to the chrominance component than the luminance component based on the luminance quantization table 46 and the chrominance quantization table 47.

According to an embodiment, the image decoding apparatus 15 may inverse quantize the compression image data for the dynamic image using the quantization parameter. In the process of decoding the dynamic image, inverse quantization may be performed on a plurality of blocks included in each frame, and compression strength may be determined based on size of the quantization parameter. In the inverse quantization step, the image decoding apparatus 15 may inverse quantize the compression image data for inversely transforming loss compressed compression image data. The image decoding apparatus 15 may inverse quantize a majority of standard images and video codecs compressed based on a loss compression according to the quantization step. For example, an inverse quantization process may be performed in the same manner as described in the image compression standard document.

The image decoding apparatus 15 may perform the inverse quantization process by inversely performing a quantization process performed by the image encoding apparatus 10 illustrated in FIGS. 4A and 4B.

Referring to FIG. 4B, the image decoding apparatus 15 may use a quantization table 44*a* to generate a DCT transform matrix 43*a*. For example, the image decoding apparatus 15 may generate the DCT transform matrix 43*a* by multiplying a quantized matrix 45*a* by the quantization table 44*a*. The quantized matrix 45*a* may include a quantized DC component 45*b* and quantized AC components 45*c*. More specifically, as the image complexity of the compression image data obtained by the image decoding apparatus 15 increases, a value of the DC component 45*b* may increase, and values of the AC components 45*c* closer to the DC component 45*b* among the AC component 45*c* may increase. Inverse quantization may be performed in accordance with AC quantization values 44*c*, which are remaining values excluding a DC quantization value 44*b*, which is a value located in a first row and a first column among values included in the quantization table 44*a*, and thus the DCT transform matrix 43*a* containing the DC component 43*b* and the AC components 43*c* may be obtained. The image decoding apparatus 15 may generate the DCT transform matrix 43*a* divided into a DC component and an AC component through an inverse quantization process.

According to an embodiment, the image decoding apparatus 15 may use a quantization table for a luminance component or a quantization table for a chrominance component as the quantization table 44*a*. Hereinafter, it will be described on the assumption that the quantization table for the luminance component is used for convenience of explanation.

Referring to FIG. 4A, the image decoding apparatus 15 may generate the transformed sub-image matrix 42 using the DCT transform matrix 43 generated through inverse quantization according to an embodiment. Specifically, the controller 18 of the image decoding apparatus 15 may generate the sub-image matrix 42 by performing inverse DCT transformation on the DCT transform matrix 43.

The controller 18 of the image decoding apparatus 15 may generate the sub-image matrix 41 by inversely transforming the transformed sub-image matrix 42 to have a value corresponding to an original image. The inverse transformation process may be a process in which the image encoding apparatus 10 inversely performs a process of transforming values of the sub-image matrix 41 to have values from −128 to 127. The values of the sub-image matrix 41 generated according to an embodiment may be represented by 8 bits.

The image decoding apparatus 15 may generate a sub-image 40 composed of 8×8 blocks for luminance components or chrominance components of raw image data generated by the image encoding device 10 based on the sub-image matrix 41.

According to an embodiment, the image decoding apparatus 15 may perform inverse transformation on the inversely quantized compression image data. In the inverse transformation step, the image decoding apparatus 15 inversely transforms the inversely quantized data using various transformation techniques. For example, in H.264, discrete cosine transformation (DCT), Hadamard transformation, and the like may be used as examples of a typical transformation technique.

According to an embodiment, the image decoding apparatus 15 may output a matrix including DCT coefficients by performing inverse DCT on at least one of a luminance component and a chrominance component. For the DCT transform matrix 43*a* including the output DCT coefficients, the image decoding apparatus 15 may perform inverse quantization using a quantization table (or a quantization matrix). Specifically, the image decoding apparatus 15 may perform an inverse quantization process of multiplying the quantization table 44*a* by the quantized metric 45*a* to generate the DCT transform matrix 43*a* including the DCT coefficients for the luminance component or the chrominance component. The image decoding apparatus 15 may generate a reconstructed image by adding the inversely transformed compression image data to a prediction image obtained through a prediction process, and the image decoding apparatus 15 may output an image based on the reconstructed image.

Figure 6:
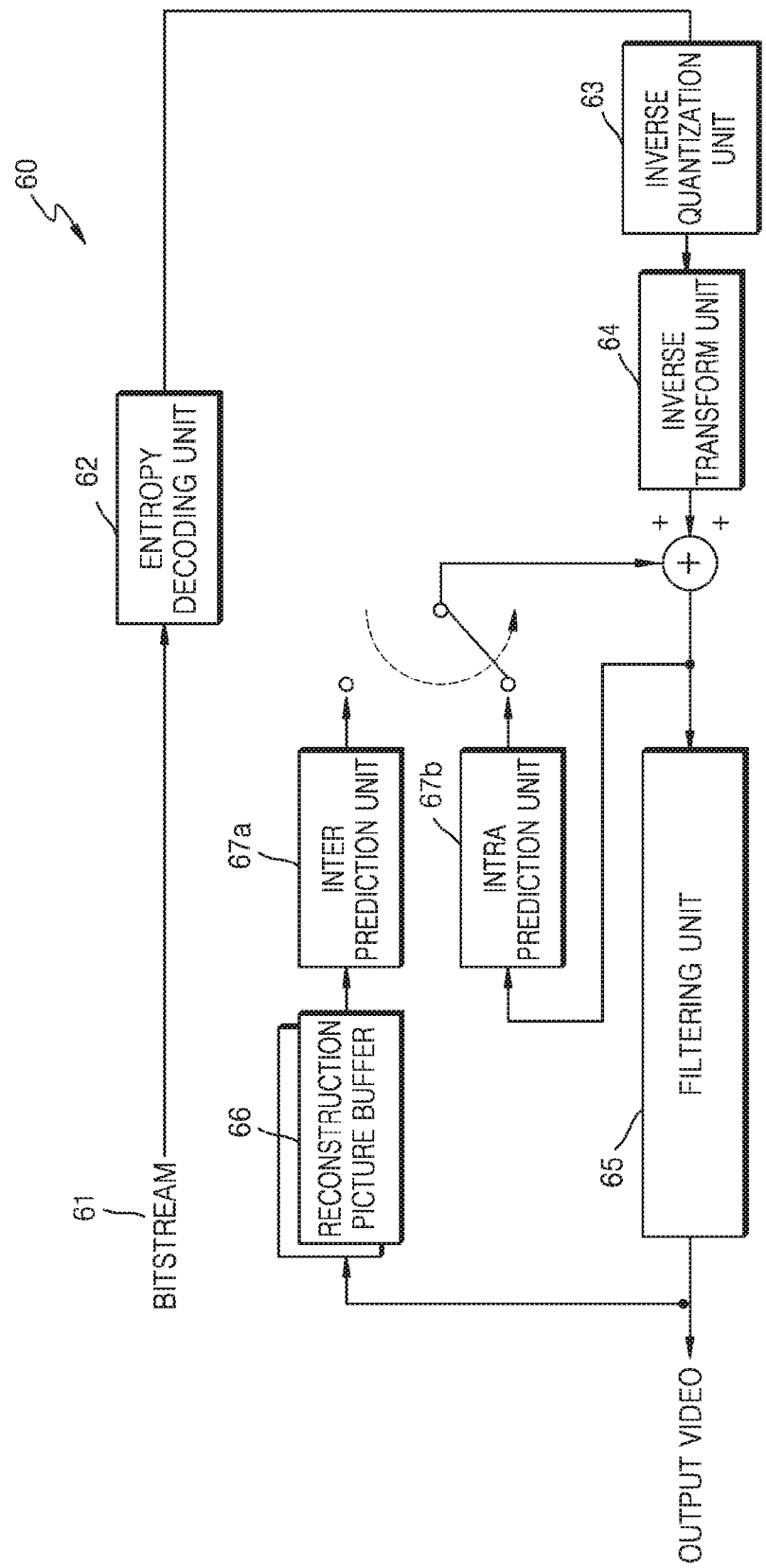
FIG. 6 shows a detailed block diagram of an image decoding apparatus for reproducing an image included in compression image data, according to an embodiment.

FIG. 6 shows a detailed block diagram of an image decoding apparatus 60 for reproducing an image included in compression image data according to an embodiment. The image decoding apparatus 60 may perform a decoding process matching an image compression standard specification used by the image coding apparatus 10 to reproduce image data compressed by the image coding apparatus 10.

An entropy decoding unit 62 may obtain, from a bitstream 61, encoded image data to be decoded and encoding information necessary for decoding from the bitstream. The encoded image data is quantized transform coefficients, and the inverse quantization unit 63 and the inverse transform unit 64 reconstruct residual data from the quantized transform coefficients. The process of performing inverse quantization using a quantization parameter in the inverse quantization unit 63 according to an embodiment may correspond to that described in relation to the inverse quantization in the quantization unit 52*b* and the inverse quantization unit 54*b* of the image encoding apparatus 50, and thus the corresponding descriptions will be omitted here.

The intra prediction unit 67*b* performs intra prediction on a prediction unit basis with respect to a coding unit of an intra mode. The inter-prediction unit 67*a* performs inter-prediction on a coding unit of an inter mode in a current image by using a reference image obtained in the reconstruction picture buffer 66 for each prediction unit.

According to an embodiment, the filtering unit 65 of the image decoding apparatus 60 may include a deblocking unit (not shown) capable of performing deblocking filtering and an SAO performing unit (not shown) capable of performing in-loop filtering using a sample adaptive offset. Data of a spatial domain for a coding unit of a current image 405 is reconstructed by adding prediction data and residual data for the coding unit of each mode through the intra prediction unit 67b or the inter prediction unit 67a and then may be output as reconstruction images through the deblocking unit (not shown) and the SAO performing unit (not shown). The reconstruction images stored in the reconstruction picture buffer 66 may be output as reference images.

The controller 18 may perform an operation to be performed by each of the entropy decoding unit 62, the inverse quantization unit 63, the inverse transform unit 64, the intra prediction unit 67b, the inter prediction unit 67a, the deblocking unit (not shown), and the SAO performing unit based on each encoding unit among the coding units according to the tree structure for each maximum encoding unit.

In particular, the intra-prediction unit 67b and the inter-prediction unit 67a determine a partition mode and a prediction mode for each coding unit among the coding units according to the tree structure, and the inverse transform unit 64 may determine whether or not to split a transform unit of a quadtree structure for each coding unit.

The encoding operation of FIG. 5 and the decoding operation of FIG. 6 describe a video stream encoding operation and a video stream decoding operation in a single layer, respectively. Accordingly, if the image decoding apparatus 60 encodes a stream of two or more layers, a process of encoding an image for each layer may be performed.

However, since the image decoding method described with reference to FIG. 6 is only an embodiment for explaining the feature in which a quantization parameter is used, the image decoding method performed by the image decoding apparatus 60 is not limited to or to be interpreted as the above decoding method.

Embodiments of the present disclosure have been described above. It will be understood by those of ordinary skill in the art that the present disclosure may be embodied in various other forms without departing from the spirit or essential characteristics thereof. Therefore, the disclosed embodiments should be considered in an illustrative rather than a restrictive sense. The scope of the present disclosure is defined by the appended claims rather than by the foregoing description, and all differences within the scope of equivalents thereof should be construed as being included in the present disclosure.

The invention claimed is:

1. An image encoding method comprising:
   obtaining imaging information determined during a process of capturing an image;
   determining a type of the image;
   generating metadata for determining a compression strength of the image based on the imaging information and the type of the image;
   when it is determined that the type of the image is a static image, determining a quantization table for quantizing the image based on the metadata;
   when it is determined that the type of the image is a dynamic image, determining a quantization parameter for quantizing the image based on the metadata; and
   encoding the image based on the quantization parameter or the quantization table,
   wherein the type of the image comprises one of the static image and the dynamic image.

2. The image encoding method of claim 1,
   wherein the obtaining of the imaging information comprises obtaining imaging information comprising at least one of an exposure value of the image, a shutter speed, an iris value, and an ISO sensitivity,
   wherein the generating of the metadata comprises generating information about an average brightness value of the image based on the obtained imaging information, and
   wherein the determining the quantization parameter or the quantization table comprises determining the compression strength of the image, based on the metadata corresponding to the information about an average brightness value of the image.

3. The image encoding method of claim 2, wherein the determining of the compression strength comprises determining the compression strength to indicate that the image is strongly compressed when the average brightness value is higher and the image is weakly compressed when the average brightness value is lower.

4. The image encoding method of claim 1,
   wherein the obtaining of the imaging information comprises obtaining imaging information from a sensor attached to an image capturing apparatus and comprising at least one of a geomagnetic sensor and an acceleration sensor,
   wherein the generating of the metadata comprises generating motion information of the image based on the obtained imaging information, and
   wherein the determining the quantization parameter or the quantization table comprises determining the compression strength of the image, based on the metadata corresponding to the motion information of the image.

5. The image encoding method of claim 1,
   wherein the obtaining of the imaging information comprises obtaining imaging information comprising at least one of information about a face recognition region and information about a focused-on region in the image,
   wherein the generating of the metadata comprises generating coordinate information related to the imaging information, based on the obtained imaging information, and
   wherein the determining the quantization parameter or the quantization table comprises determining the compression strength of the image, based on the metadata corresponding to the coordinate information.

6. The image encoding method of claim 5, wherein the determining of the compression strength comprises determining of the compression strength to indicate that a region indicated by the imaging information is compressed relatively more weakly than other regions of the image.

7. The image encoding method of claim 5, wherein the obtaining of the imaging information comprises obtaining imaging information comprising at least one of information about a face recognition region and information about a focused-on region, based on a preview image related to the image.

8. The image encoding method of claim 1, wherein the determining of the compression strength comprises determining the compression strength to indicate that the image is strongly compressed when the motion information indicates that the apparatus moves fast.

9. A non-transitory computer-readable recording medium having recorded thereon a computer program for executing the image encoding method of claim 1.

10. An image encoding apparatus comprising:
an imaging information obtainer configured to obtain imaging information determined during a process of capturing an image; and
a controller configured to determine a type of the image; generate metadata for determining a compression strength of the image based on the imaging information and the type of the image; when it is determined that the type of the image is a static image, determine a quantization table for quantizing the image based on the metadata; when it is determined that the type of the image is a dynamic image, determine a quantization parameter for quantizing the image based on the metadata; and encode the image based on the quantization parameter or the quantization table,
wherein the type of the image comprises one of the static image and the dynamic image.

11. The image encoding apparatus of claim 10,
wherein the imaging information obtainer is further configured to obtain imaging information comprising at least one of an exposure value of the image, a shutter speed, an iris value, and an ISO sensitivity, and
wherein the controller is further configured to generate information about an average brightness value of the image based on the obtained imaging information, and determine the compression strength of the image, based on the metadata corresponding to the information about an average brightness value of the image.

12. The image encoding apparatus of claim 10,
wherein the imaging information obtainer is further configured to obtain imaging information from a sensor attached to an image capturing apparatus and comprising at least one of a geomagnetic sensor and an acceleration sensor, and
wherein the controller is further configured to generate motion information of the image, based on the obtained imaging information, and determine the compression strength of the image, based on the metadata corresponding to the motion information of the image.

13. The image encoding apparatus of claim 10,
wherein the imaging information obtainer is further configured to obtain imaging information comprising at least one of information about a face recognition region and information about a focused-on region in the image, and
wherein the controller is further configured to generate coordinate information related to the imaging information, based on the obtained imaging information, and determine the compression strength of the image, based on the metadata corresponding to the coordinate information.

14. The image encoding apparatus of claim 13, wherein the controller is further configured to determine the compression strength to indicate that a region indicated by the imaging information is compressed relatively more weakly than other regions of the image.

15. The image encoding apparatus of claim 13, wherein the imaging information obtainer is further configured to obtain imaging information comprising at least one of information about a face recognition region and information about a focused-on region, based on a preview image related to the image.

16. The image encoding apparatus of claim 10, wherein the controller is further configured to determine the compression strength to indicate that the image is strongly compressed when the average brightness value is higher and the image is weakly compressed when the average brightness value is lower.

17. The image encoding apparatus of claim 10, wherein the controller is further configured to determine the compression strength that the image is strongly compressed when the motion information indicates that the apparatus moves fast.

18. The image encoding apparatus of claim 10, wherein the controller is further configured to determine a quantization parameter or a quantization table for quantizing the image based on the metadata.

* * * * *